(12) United States Patent
Kilgour

(10) Patent No.: US 9,526,054 B2
(45) Date of Patent: Dec. 20, 2016

(54) METHOD FOR SUBSCRIBER IDENTITY DETERMINATION, NETWORK ELEMENTS AND WIRELESS COMMUNICATION SYSTEM THEREOF

(71) Applicant: IP Access Limited, Cambridge (GB)

(72) Inventor: Christopher Edward John Kilgour, Cambridge (GB)

(73) Assignee: ip.Access Limited, Cambridge (GB)

( * ) Notice: Subject to any disclaimer, the term of this patent is extended or adjusted under 35 U.S.C. 154(b) by 0 days.

(21) Appl. No.: 14/889,535

(22) PCT Filed: Apr. 9, 2014

(86) PCT No.: PCT/EP2014/057119
§ 371 (c)(1),
(2) Date: Nov. 6, 2015

(87) PCT Pub. No.: WO2014/180619
PCT Pub. Date: Nov. 13, 2014

(65) Prior Publication Data
US 2016/0119843 A1    Apr. 28, 2016

(30) Foreign Application Priority Data
May 8, 2013  (GB) .................................. 1308204.5

(51) Int. Cl.
*H04W 36/00* (2009.01)
*H04W 36/16* (2009.01)
(Continued)

(52) U.S. Cl.
CPC ......... *H04W 36/16* (2013.01); *H04W 36/0055* (2013.01); *H04W 36/0066* (2013.01);
(Continued)

(58) Field of Classification Search
CPC ............ H04W 36/15; H04W 36/0055; H04W 36/0066; H04W 8/18; H04W 36/14
(Continued)

(56) References Cited

U.S. PATENT DOCUMENTS 7,680,081 B2 *   3/2010   Kamura ................ H04L 43/022
                                                            370/328
8,233,450 B2 *   7/2012   Zaki .................. H04W 36/0066
                                                            370/328
(Continued)

FOREIGN PATENT DOCUMENTS

WO    WO 2006/073225 A2    7/2006

OTHER PUBLICATIONS

Considerations regarding Energy Saving Solutions 3GPP TSG-RAN WG3 #75R3-120312 Agenda Item 13. 1 Dresden, Germany, Feb. 6-10, 2012.

*Primary Examiner* — Marceau Milord
(74) *Attorney, Agent, or Firm* — Optimus Patents US, LLC

(57) ABSTRACT

A method and network elements for obtaining a subscriber identity of a User Equipment (105) being served by a LTE cell (104) exploits a conventional handover procedure by generating a "fake" handover request at the LTE (source) cell (104) designating a 3G cell (102) as the target. The target 3G cell is arranged to forward the subscriber identity which is included in a relocation request message received from a core network (107) to the LTE cell and to send a relocation failure message back to the core network.

16 Claims, 2 Drawing Sheets

(51) Int. Cl.
*H04W 36/38* (2009.01)
*H04W 8/18* (2009.01)
*H04W 36/14* (2009.01)

(52) U.S. Cl.
CPC ............ *H04W 36/385* (2013.01); *H04W 8/18* (2013.01); *H04W 36/14* (2013.01)

(58) Field of Classification Search
USPC ................................ 455/436, 437, 439, 442
See application file for complete search history.

(56) References Cited

U.S. PATENT DOCUMENTS

| | | | |
|---|---|---|---|
| 8,233,455 B2* | 7/2012 | Shaheen | H04W 36/005 370/331 |
| 8,848,688 B1* | 9/2014 | Wurtenberger | H04W 36/0083 370/351 |
| 8,929,894 B2* | 1/2015 | Catovic | H04W 76/027 370/216 |
| 8,954,051 B2* | 2/2015 | Tinnakornsrisuphap | H04W 36/04 370/331 |
| 2008/0064399 A1* | 3/2008 | Lin | H04W 36/32 455/436 |
| 2009/0042597 A1* | 2/2009 | Yuuki | H04W 76/022 455/525 |
| 2011/0149913 A1* | 6/2011 | Park | H04W 36/0083 370/332 |
| 2013/0260741 A1* | 10/2013 | Yamada | H04W 24/00 455/422.1 |

* cited by examiner

METHOD FOR SUBSCRIBER IDENTITY DETERMINATION, NETWORK ELEMENTS AND WIRELESS COMMUNICATION SYSTEM THEREOF

FIELD OF THE INVENTION

The field of this invention relates to network elements, a wireless communication system and methods for determining a subscriber identity of a wireless communication unit

BACKGROUND OF THE INVENTION

Wireless communication systems, such as the $3^{rd}$ Generation (3G) of mobile telephone standards and technology, are well known. An example of such 3G standards and technology is the Universal Mobile Telecommunications System (UMTS™), developed by the $3^{rd}$ Generation Partnership Project (3GPP™) (www.3gpp.org). The $3^{rd}$ generation of wireless communications has generally been developed to support macro-cell mobile phone communications. Such macro cells utilise high power base stations (NodeBs in 3GPP parlance) to communicate with wireless communication units within a relatively large geographical coverage area. Typically, wireless communication units, or User Equipment (UEs) as they are often referred to in 3G parlance, communicate with a Core Network (CN) of the 3G wireless communication system via a Radio Network Subsystem (RNS). A wireless communication system typically comprises a plurality of radio network subsystems, each radio network subsystem comprising one or more cells to which UEs may attach, and thereby connect to the network. Each macro-cellular RNS further comprises a controller, in a form of a Radio Network Controller (RNC), operably coupled to the one or more Node Bs, via a so-called Iub interface.

The second generation wireless communication system (2G), also known as GSM, is a well-established cellular, wireless communications technology whereby "base transceiver stations" (equivalent to the Node B's of the 3G system) and "mobile stations" (user equipment) can transmit and receive voice and packet data. Several base transceiver stations are controlled by a Base Station Controller (BSC), equivalent to the RNC of 3G systems.

Communications systems and networks are developing towards a broadband and mobile system. The 3rd Generation Partnership Project has proposed a Long Term Evolution (LTE) solution, namely, an Evolved Universal Mobile Telecommunication System Territorial Radio Access Network, (E-UTRAN), for a mobile access network, and a System Architecture Evolution (SAE) solution, namely, an Evolved Packet Core (EPC), for a mobile core network. An evolved packet system (EPS) network provides only packet switching (PS) domain data access so voice services are provided by a 2G or 3G Radio Access Network (RAN) and circuit switched (CS) domain network or Voice over IP (VoIP) techniques. User Equipment (UE) can access a CS domain core network through a 2G/3GRAN such as the (Enhanced Data Rate for GSM Evolution, EDGE) Radio Access Network (GERAN) or a Universal Mobile Telecommunication System Terrestrial Radio Access Network (UTRAN), and access the EPC through the E-UTRAN.

Some User Equipments have the capability to communicate with networks of differing radio access technologies. For example, a user equipment may be capable of operating within a UTRAN and within an E-UTRAN.

Lower power (and therefore smaller coverage area) cells are a recent development within the field of wireless cellular communication systems. Such small cells are effectively communication coverage areas supported by low power base stations. The terms "picocell" and "femtocell" are often used to mean a cell with a small coverage area, with the term femtocell being more commonly used with reference to residential small cells. Small cells are often deployed with minimum RF (radio frequency) planning and those operating in consumers' homes are often installed in an ad hoc fashion. The low power base stations which support small cells are referred to as Access Points (AP's) with the term Home Node B (HNB's) or Evolved Home Node B (HeNB) identifying femtocell Access Points. Each small-cell is supported by a single Access Point. These small cells are intended to augment the wide area macro network and support communications to multiple User Equipment devices in a restricted, for example, indoor environment. An additional benefit of small cells is that they can offload traffic from the macro network, thereby freeing up valuable macro network resources An HNB is an Access Point that provides a wireless interface for user equipment connectivity. It provides a radio access network connectivity to a user equipment (UE) using the so-called Iuh interface to a network Access Controller, also known as a Home Node B Gateway (HNB-GW). One Access Controller (AC) can provide network connectivity of several HNB's to a core network.

Typical applications for such Access Points include, by way of example, residential and commercial locations, communication 'hotspots', etc., whereby Access Points can be connected to a core network via, for example, the Internet using a broadband connection or the like. In this manner, small cells can be provided in a simple, scalable deployment in specific in-building locations where, for example, network congestion or poor coverage at the macro-cell level may be problematic.

Thus, an AP is a scalable, multi-channel, two-way communication device that may be provided within, say, residential and commercial (e.g. office) locations, 'hotspots' etc, to extend or improve upon network coverage within those locations. Although there are no standard criteria for the functional components of an AP, an example of a typical AP for use within a 3GPP 3G system may comprise Node-B functionality and some aspects of Radio Network Controller (RNC) functionality as specified in 3GPP TS 25.467. These small cells are intended to be able to be deployed alongside the more widely used macro-cellular network and support communications to UEs in a restricted, for example 'in-building', environment.

Herein, the term "small cell" means any cell having a small coverage area and includes "picocells" and "femtocells."

The LTE protocol design encrypts the Non-Access Stratum (NAS) between the UE and the MME (Mobility Management Entity) by using separate keys from the RRC (Radio Resource Control) layer, which is ciphered between the UE and the eNodeB. This is a change from 3G, where a common technique in small cells is for a Home NodeB to request the UE's permanent subscriber identity (IMSI) using a NAS (Non-Access Stratum) Identity Request message. This result can be used for access control within a cell or logging particular performance behaviours. However, the NAS ciphering deployed in LTE means that a eNodeB (or a Home eNodeB) cannot use this technique. Such a request would have to be issued by the MME, and even if the MME were to issue such a request, the UE response would not be readable by the eNodeB because of the ciphering.

SUMMARY OF THE INVENTION

Accordingly, the invention seeks to mitigate, alleviate or eliminate the above-mentioned disadvantage.

Aspects of the invention provide network elements, a wireless communication system and methods therefor as described in the appended claims.

According to a first aspect of invention there is provided a method for determining a subscriber identity of a wireless communication unit located in a first cell of a wireless communication system comprising a plurality of network elements and a core network, the method including, at a first network element serving the first cell, obtaining an identity of a second network element, initiating a handover procedure by generating a handover required message which designates the second network element as a handover target and which includes information to identify the first cell, and sending the handover required message to the core network, and at the second network element, receiving from the core network a relocation request message requesting handover of the wireless communication unit from the first cell to the second network element and which includes information to identify the first cell and the subscriber identity of the wireless communication unit, sending to the first network element, a message including the received subscriber identity, and sending to the core network a relocation failure message.

The method may further include, at the first network element, terminating the handover procedure on receipt of a handover preparation failure message from the core network.

In one embodiment the first network element may be provided with the second network element's identity by way of a provisioning process. Alternatively, a link may be established between the two network elements and a message may be sent from the second element to the first element, such message including the identity of the second element.

The handover required message may comprise an S1 Handover Required message comprising a Source to Target Transparent Container which includes the identity of the first cell in a last visited cell list of User Equipment History Information.

A cause code included in the handover required message may be one that will not result in an attempt by the core network to modify the behaviour of any handover process and/or which may help to identify the message as being a fake handover attempt Optionally, the first network element may send an alert message to the second network element indicating that a fake handover is being attempted. This alert message helps the second network element to correctly identify the relocation request message, which it subsequently receives from the core network, as a fake handover request which is not to be confused with other valid handover procedures which may be taking place at the same time. An alert message may also include an identifier such as a numeric or alphanumeric string, possibly combined with an identity for the first network element in order to enable response identification, ie. the first network element will receive the same or related identifier in the response message from the second network element, enabling the first network element to correlate the original alert and handover required message with the response. Receipt of an alert message by the second network element may create a timestamp. The alert message may also contain other relevant data to help identify the source of the message. Examples of relevant data may be the cause value set in the handover required message, the number of radio access bearers in the first (source) cell, user plane transport layer addresses (which can expect to stay the same during handover), the value of the Target Cell ID set in the Source to Target Transparent Container and the size of the Source to Target Transparent Container. Such an alert message may alternatively be a complete copy of the handover required message which the first network element sends to the core network.

In one embodiment, the subscriber identity which is included in the relocation request message received at the second network element and included in the message sent by the second network element to the first network element comprises a permanent Non-Access Stratum User Equipment identity.

According to a second aspect of the invention, there is provided network elements for determining a subscriber identity of a wireless communication unit located in a first cell of a wireless communication system comprising a plurality of network elements and a core network. A first network element serves a first cell and a second network element, the first network element including a first memory for storing an identity of the second, network element, and a first signal processor arranged to generate a handover required message for transmission to the core network, wherein the handover required message designates the second network element as a handover target and includes information to identify the first cell, and arranged to receive a subscriber identity message from the second network element containing the subscriber identity of the wireless communication unit, and wherein the second network element includes a second signal processor arranged to generate a subscriber identity message for transmission to the first network element on receiving a relocation request message, including information to identify the first cell and the subscriber identity from the core network, and arranged to generate a relocation failure message for transmission to the core network.

The second signal processor may be arranged to identify the first cell.

In one embodiment, the second network element is arranged to transmit a message containing the identity of the second network element to the first network element.

Optionally, the first signal processor may be arranged to include a cause code in the handover required message that facilitates identification of the message as a "fake" handover.

Optionally, the first signal processor may be arranged to generate an alert message for transmitting to the second network element which indicates that a fake handover is being attempted.

In one embodiment, the first cell is a LTE cell and the second network element supports a 3G cell. In this embodiment, the first network element may be an Evolved Node B or alternatively may be an Evolved Home Node B. The second network element may be a Home Node B coupled to a Home Node B Gateway. Alternatively, the second element may be a Radio Network Controller.

In another embodiment, the second network element may only partially support the full Home Node B functionality. That is to say that it need not actually transmit over the air interface but only needs to respond to handover request messages and convey the received subscriber identity to the first network element. Such a (second) network element would effectively be a "phantom" Home Node B.

The invention has the advantage of providing a means for determining the IMSI of a User Equipment in a LTE cell without breaching the LTE inherent security design or behaviour.

The invention may make use of a preparation phase of an inter-Radio Access Technology handover operation in order to obtain subscriber identities (IMSI) without actually handing the subscriber over to an alternative technology or modifying standard communication messages with the core network.

The signal processors and/or memories of the first and second network elements may be implemented in one or more integrated circuits.

According to a third aspect of the invention there is provided a wireless communication system arranged to support the method and network elements of the above aspects.

According to an aspect of the invention, there is provided at least one tangible computer program product having an executable computer program code stored thereon for execution by a processor to perform a method in accordance with the first aspect. The at least one tangible computer program product may comprise at least one from a group consisting of: a hard disk, a CD-ROM, an optical storage device, a magnetic storage device, a Read Only Memory, a Programmable Read Only Memory, an Erasable Programmable Read Only Memory, an Electrically Erasable Programmable Read Only Memory and a Flash memory.

These and other aspects, features and advantages of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION

The inventive concept finds particular applicability in a cellular communication system that supports a number of overlapping communication coverage areas, for example a communication system that comprises a combination of small cells and macro cells. Further, the inventive concept finds applicability in a cellular communication system comprising more than one Radio Access Technology.

Those skilled in the art will recognize and appreciate that the specifics of the specific examples described are merely illustrative of some embodiments and that the teachings set forth herein are applicable in a variety of alternative settings. For example, since the inventive concepts do not depend on any particular combination of radio access technologies, it is envisaged that the inventive concepts can be applied to other combinations of RAT's although a combination of LTE systems and 3G systems are shown in the embodiments. As such, other alternative implementations within cellular communication systems conforming to different standards are contemplated and are within the scope of the various teachings described.

Figure 1:
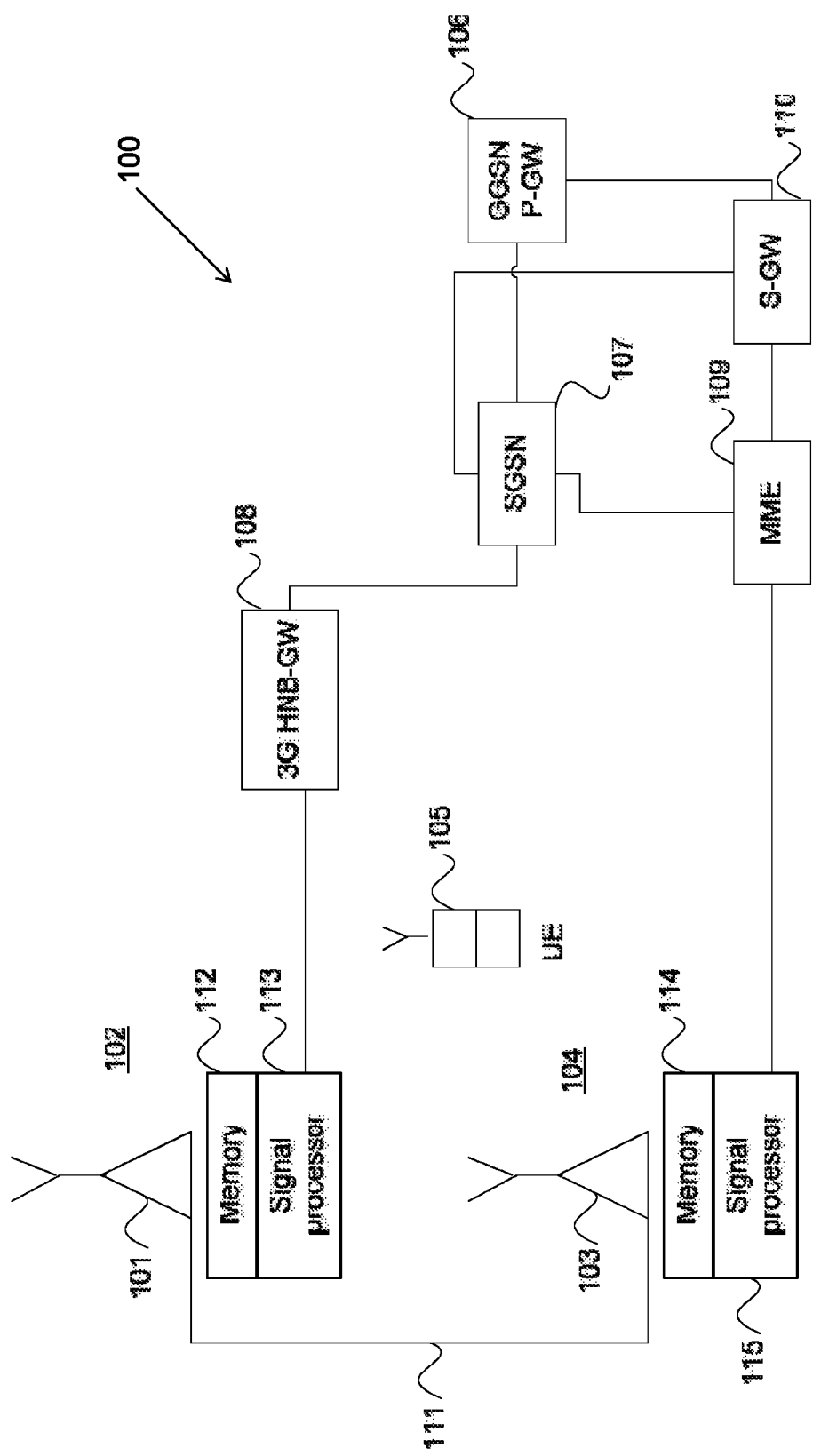
FIG. 1 illustrates a part of a cellular communication system operating in accordance with an example embodiment.

Referring now to FIG. 1, an example of part of a wireless communication system operating in accordance with embodiments of the invention is illustrated and indicated generally at 100 and comprises a Home Node B 101 serving a small 3G cell 102 and an evolved Home Node B supporting a LTE (E-UTRAN) small cell 104. A User Equipment 105 is attached to the LTE cell 104. A core network of the Wireless Communications System of FIG. 1 includes a Gateway General Packet Radio System (GPRS) Support Node (GGSN) 106 and a Serving GPRS Support Node (SGSN) 107. The GGSN 106 is responsible for interfacing the wireless communication system 100 with a packet data network, eg. a Packet Switched Data Network (PSDN) (such as the internet). The SSGN 107 performs a routing and tunnelling function for traffic to and from the cells 102, 104 while the GGSN 106 links with external packet networks. In an Evolved Packet Core, the equivalent node to a GSGN is a Packet Gateway (P-GW) and in this example, they are shown combined.

The (3G) Home Node B 101 is linked to the SGSN 107 by way of Iu-PS and Iuh links via a 3G Home Node B Gateway HNB-GW 108. The evolved Home Node B 103 is linked to the SSGN 107 through a Mobility Management Entity (MME) 109. The evolved Home Node B is also connected with the P-GW 106 through the MME 109 and a Service Gateway S-GW 110. The MME 109 handles signalling control and mobility while the S-GW 110 is a local anchor point for user data.

A communications link 111 is provided between the Home Node B 101 and the evolved Home Node B 103. This link may be wireless or wired.

The Home Node B 101 is provided with a memory 112 and a signal processing module 113 whose function will be described below. The evolved Home Node B 103 is also provided with a memory 114 and a signal processing module 115.

Figure 2:
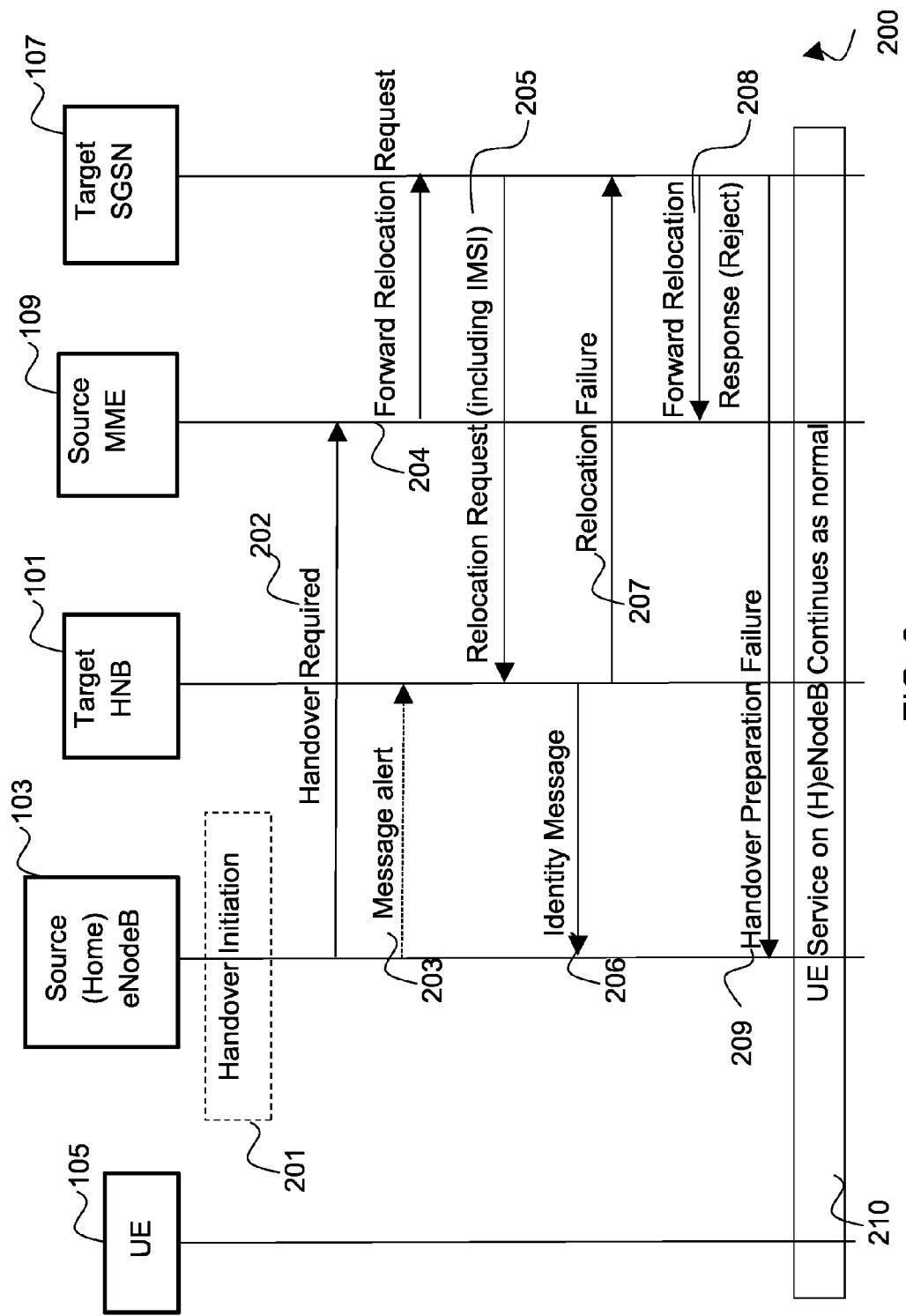
FIG. 2 is a message flowchart of an example of a method for determining a subscriber identity.

Operation of the embodiment of FIG. 1 will now be described with reference to FIG. 1 and to the message flowchart of FIG. 2. Initially, the Home Node B 101 is registered with the HNB-GW 108. The evolved Home Node B 103 is pre-provisioned with the identity of the Home Node B 101. In this example where the Home Node B is supporting a cell, the identity can be the cell identity. The identity of the Home Node B 101 is stored in the memory 114 of the evolved Home Node B. In an alternative arrangement, for example, the Home Node B 101 sends its identity to the evolved Home Node B 103 over the link 111 and the received identity is stored in the memory 114.

In this example, the User Equipment 105 is located in the area of coverage of the LTE cell 104 and is registered with the evolved Home Node B 103 such that it can receive services from the core network via the evolved Home Node B 103. As mentioned above, the evolved Home Node B 103 supporting the LTE cell 104 cannot learn the IMSI of the User Equipment 105 by sending it an Identity Request (as would be the case for a 3G cell). However, 3GPP Release 8 introduced the functionality (mandatory for LTE) for 2G, 3G and LTE cells (RNC, HNB, (H)eNodeB) to provide information during handover about the identities of, and time that UEs received service in, previous cells. This is recorded in the "UE History Information" Information Element (as described in 3GPP Technical Specification 36.413 Section 9.2.1.42) which contains the "Last Visited Cell List". This information may be included in the Source to Target Transparent Container used in handover messaging (e.g. S1 Handover Required (mandatory), 3G Relocation Request). Hence, the evolved Home Node B 103, wishing to identify the IMSI associated with the User Equipment 105 exploits this handover functionality and initiates a handover 201 by issuing a S1 Handover Required message 202 towards the core network (MME 109) with the Home Node B 101 as the handover target (although, of course a handover is not actually required) and including its Cell Identity in the Last Visited Cell List of the UE History. A cause code is also set that facilitates identification of the handover message (e.g. Misc Unspecified). Other alternative means to provide information to help identify the source cell to the Home Node B may involve embedding information in the Target Cell ID element in the Source RNC to Target RNC Transparent Container. The signal processor 115 in the evolved Home Node B 103 generates the "fake" Handover Required message including the information on the cell identity. The core network sees the message as a bona fide Handover Required message however. So that the Home Node B 101 can be made aware that the "fake" handover request is being sent, the signal processor 115 in the evolved Home Node B 103 also generates an alert message 203 which is sent to the Home Node B on the link 111. The alert message is structured so that the Home Node B 101 can correctly identify an incoming Relocation Request as the one initiated by the fake handover request. This alert message also contains an identifier so that the Home Node B 101 knows that the fake handover request was initiated by the evolved Home Node B 103. The Home Node B 101 then stores the identifier in its memory 112 for future reference. The Relocation Request message contains the evolved Home Node B as the most recent cell in the Last Visited Cell list and also contains the Permanent NAS User Equipment Identity (i.e. IMSI) of the UE (as described in 3GPP Technical Specification TS 25.413 Rel-8+ Section 9.1.10). The MME 109 generates a Forward Relocation Request message 204. The SGSN 107 then creates a Relocation Request message 205, which includes the UE's IMSI.

On receiving the Relocation Request via the HNB-GW 108, the signal processor 113 in the Home Node B 101 identifies the initiating cell by determining that the most recent cell in the last visited cell list is the same cell whose identity was included in the alert message (and stored in the memory 112. Hence, the signal processor 113 generates an identity message 206 which is sent to the evolved Home Node B 103 over the link 111. The message contains the IMSI of the User Equipment 105 which the signal processor 113 extracts from the Relocation Request. Optionally it may also contain information to enable the evolved Home Node B 103 to identify the original alert message, in case more than one such identification process is occurring concurrently. This information could include, but not necessarily be limited to, the identifier supplied by the evolved Home Node B in the alert message 203. The signal processor 113 also generates a Relocation Failure message 207 which is sent from the Home Node B 101 to the core network (SGSN 107) via the HNB-GW. As is conventional, this results in the core network (SGSN 107) generating and forwarding to the MME 109 a Relocation Response (Reject) message 208. Subsequently, the MME 109 sends a Handover Preparation Failure message 209 to the evolved Home Node B 103. On receipt of this Handover Preparation Failure message, the evolved Home Node B closes the handover procedure and services provided to the User Equipment 105 continue as normal 210.

The signal processing functionality of the embodiments of the invention, particularly the signal processing modules 113 and 115 may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' 'non-transitory computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

I claim:

1. A method for determining a subscriber identity of a wireless communication unit located in a first cell of a wireless communication system comprising a plurality of network elements and a core network, the method comprising, at a first network element:
serving the first cell,
obtaining an identity of a second network element,
initiating a handover procedure by generating a handover required message that designates the second network element as a handover target cell and that includes information to identify the first cell, and
sending the handover required message to the core network,
and the method comprising, at the second network element:
receiving, from the core network, a relocation request message requesting handover of the wireless communication unit from the first cell to the second network element that includes information to identify the first cell and the subscriber identity of the wireless communication unit,
sending to the first network element a message including the received subscriber identity, and
sending to the core network, a relocation failure message.

2. The method of claim 1, wherein obtaining an identity of the second network element comprises provisioning the first network element with the identity of the second network element.

3. The method of claim 1, wherein obtaining an identity of the second network element comprises, at the second network element, sending a message to the first network element containing the identity of the second network element.

4. The method of claim 1, wherein the handover required message comprises an S1 Handover Required message comprising a Source to Target Transparent Container that includes the identity of the first cell in a last visited cell list of User Equipment History Information.

5. The method of claim 1, wherein a cause code included in the handover required message is one that will not result in an attempt by the core network to modify the behaviour of a handover process.

6. The method of claim 1, including, at the first network element sending an alert message to the second network element indicating that a fake handover is being attempted.

7. The method of claim 6, wherein said alert message comprises a copy of the handover required message.

8. The method of claim 6, wherein said alert message includes an identifier that facilitates identification of the handover required message.

9. The method of claim 1, wherein the subscriber identity included in the relocation request message received at the second network element and included in the message sent by the second network element to the first network element comprises a Permanent Non-Access Stratum, NAS, User Equipment identity.

10. A first network element for determining a subscriber identity of a wireless communication unit located in a first cell of a wireless communication system comprising a plurality of network elements and a core network, the first network element serving a first cell comprising:
 a first memory configured to store an identity of a second network element, and
 a first signal processor configured to:
  generate a handover required message for transmission to the core network, wherein the handover required message designates the second network element as a handover target and includes information to identify the first cell, and
  receive a subscriber identity message from the second network element containing the subscriber identity of the wireless communication unit that was generated in response to the subscriber identity message and a subscriber identity received at the second network element.

11. The first network element of claim 10, wherein the first signal processor is arranged to include a cause code in the handover required message that helps to identify the handover required message as being a fake handover attempt.

12. The first network element of claim 10, wherein the first signal processor is arranged to generate an alert message for transmitting to the second network element which indicates that a fake handover is being attempted.

13. A second network element for determining a subscriber identity of a wireless communication unit located in a first cell of a wireless communication system comprising a plurality of network elements and a core network, the second network element comprising:
 a receiver configured to receive a relocation request message, which includes information to identify a first cell served by a first network element and a subscriber identity of a wireless communication unit, from the core network,
 a transmitter configured to transmit a subscriber identity message to the first network element containing the subscriber identity of a wireless communication unit, and
 a second signal processor configured to:
  generate a subscriber identity message for transmission to the first network element in response to receiving the relocation request message, and
  generate a relocation failure message for transmission to the core network.

14. The second network element of claim 13, wherein the transmitter is further configured to transmit a message containing the identity of the second network element to the first network element.

15. A wireless communication system comprising:
 a core network,
 at least one wireless communication unit,
 a second network element, and
 a first network element serving a first cell comprising:
  a first memory configured to store an identity of the second network element, and
  a first signal processor configured to:
   generate a handover required message for transmission to the core network wherein the handover required message designates the second network element as a handover target and includes information to identify the first cell, and
   receive a subscriber identity message from the second network element containing the subscriber identity of the wireless communication unit, and
 wherein the second network element comprises:
  a second signal processor configured to:
   generate a subscriber identity message for transmission to the first network element on receiving a relocation request message including information to identify the first cell and the subscriber identity, from the core network, and
   generate a relocation failure message for transmission to the core network.

16. The wireless communication system of claim 15, wherein the first cell is a Long Term Evolution, LTE, cell.

\* \* \* \* \*